United States Patent [19]

Ching

[11] Patent Number: 5,283,137
[45] Date of Patent: Feb. 1, 1994

[54] COVER ASSEMBLY FOR RECHARGEABLE BATTERY

[75] Inventor: Larry K. W. Ching, Littleton, Colo.

[73] Assignee: Optima Batteries, Inc., Denver, Colo.

[21] Appl. No.: 693,988

[22] Filed: Apr. 29, 1991

[51] Int. Cl.$^5$ .............. H01M 2/08; H01M 2/02; H01M 2/10

[52] U.S. Cl. .............. 429/175; 16/125; 429/90; 429/91; 429/179; 429/187

[58] Field of Search .............. 429/175, 179, 187, 90, 429/91

[56] References Cited

U.S. PATENT DOCUMENTS

| | | | |
|---|---|---|---|
| 2,737,542 | 3/1956 | Shannon et al. | 429/175 |
| 2,886,622 | 5/1959 | Shannon | 429/175 |
| 3,457,119 | 7/1969 | Tench | 429/187 |
| 3,937,636 | 2/1976 | Slautterback | 429/179 |
| 3,961,988 | 6/1976 | Andreoff | 429/175 |
| 4,632,888 | 12/1986 | Kump et al. | 429/187 |
| 4,770,957 | 9/1988 | Miyagawa | 429/175 |
| 4,857,422 | 8/1989 | Stocchiero | 429/175 |

FOREIGN PATENT DOCUMENTS

| | | | |
|---|---|---|---|
| 2042249 | 9/1980 | United Kingdom | 429/175 |
| 2087637 | 5/1982 | United Kingdom | 429/175 |

Primary Examiner—Wayne Langel
Attorney, Agent, or Firm—Donald W. Margolis; John L. Isaac

[57] ABSTRACT

A device is disclosed both for covering a multi-cell rechargeable battery having upper terminal connections and for use as a mounting spacer for the battery. The device includes a cover sized and shaped to shield the top surface of the battery when attached thereto and has a plate with apertures disposed therein to provide limited access to the upper terminal connections. A mechanism is provided for spacing the lid from the top surface of the battery to recess the upper terminal connections relative to the upper surface of the plate for protection against surface contact and electrical shorting, the spacing mechanism being integral with the plate. An attachment device is also provided for selectively attaching the cover to the battery to protect the battery top surface and upper terminal connections from damage from objects placed on the plate. The attachment device is further adapted for selectively securing the cover to the bottom surface of the battery to function as a spacer for battery mounting. Finally, a mechanism is provided for testing of the electrical condition of the battery without removing the cover.

35 Claims, 9 Drawing Sheets

COVER ASSEMBLY FOR RECHARGEABLE BATTERY

BACKGROUND OF THE INVENTION

1. Field of the Invention

This invention relates to multi-cell rechargeable batteries and, more particularly, to sealed batteries employing a mono-block container for housing a plurality of cells. Specifically, the present invention relates to a multi-purpose, integral spacer and cover for multi-cell rechargeable batteries.

2. Description of the Prior Art

A variety of configurations are well known for multi-cell rechargeable battery housings. Such housings have taken a number of different shapes and have included housing structures for cylindrically shaped cells. Typically, the cells are fitted into mono-block containers having an outer parallelepiped shape, such as illustrated in U.S. Pat. Nos. 2,543,106, 2,836,642, 4,346,151 and U.S. Pat. No. 4,592,972. In such mono-block housings adapted for cylindrical cells, the housing top or lid is generally positioned after the cells and electrolyte are introduced into the housing. The lid is then sealed, and the underside of the lid has appropriate inter-connecting members for the various cells contained within the housing. These interconnecting members are introduced to the outside through two top terminal posts which protrude through the lid. The above mentioned U.S. Patents as well as U.S. Pat. No. 4,383,011 illustrate a variety of lid structures available for such battery housings.

Certain battery applications require that the battery terminals preferably be positioned along the side portion of the battery. In order to avoid the necessity of having to utilize special adapters to use a top terminal battery in such side terminal applications, certain battery designs have become available which include a pair of top terminal posts as well as a pair of side terminal posts, thereby enabling the battery to be readily utilized in either type of connection application. This is particularly true in automobile battery applications. Unfortunately, existing battery designs do not include any type of device to protect the top terminal posts from damage during transportation or inadvertent shorting when the side terminal posts are being utilized. Moreover, it is not infrequent to require the elevation of batteries when placed within certain automobile applications. Such applications constantly require on-the-spot adjustments with whatever materials are available to raise or elevate the battery relative to the housing holder within the automobile. Thus, there is a need for battery housing structures which include some sort of terminal protection as well as some sort of spacing device as optional features.

SUMMARY OF THE INVENTION

A device is disclosed for covering a multi-cell rechargeable battery having top and bottom surfaces and upper terminal connections projecting from the top surface, and for use as a mounting spacer for the battery. The device includes a cover sized and shaped to shield the top surface of the battery when attached thereto including a plate having upper and lower surfaces with apertures disposed therein to provide limited access to the upper terminal connections. A mechanism is provided for spacing the plate from the battery top surface to recess the upper terminal connections relative to the surface of the plate for protection against surface contact and electrical shorting, the spacing mechanism being integral with the plate. Apparatus is further provided for selectively attaching the cover to the battery to protect the battery top surface and upper terminal connections from damage from objects placed on the plate. The attachment apparatus is further adapted for selectively securing the cover to the bottom surface of the battery to function as a spacer for battery mounting. Finally, a mechanism is provided for permitting testing of the electrical condition of the battery without removing the cover.

BRIEF DESCRIPTION OF THE DRAWINGS

The accompanying drawings which are incorporated in and form a part of the specification illustrate preferred embodiments of the present invention and together with the description, serve to explain the principles of the invention. In the drawings.

DETAILED DESCRIPTION OF THE PREFERRED EMBODIMENTS

Figure 1:
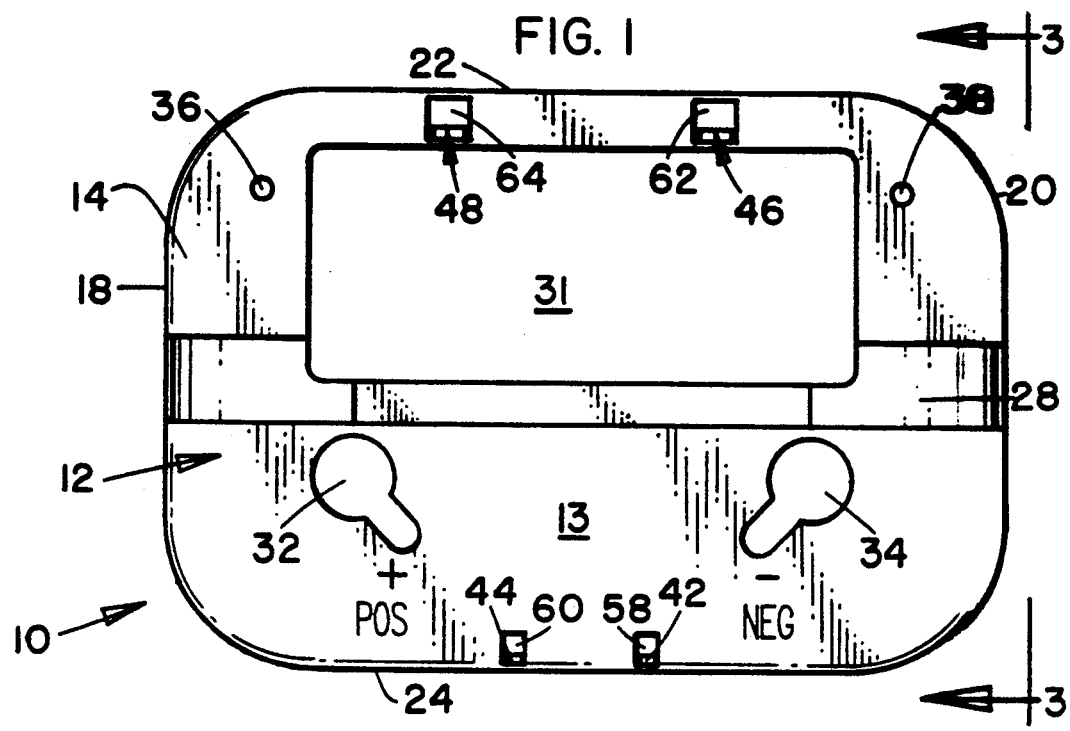
FIG. 1 is a top plan view of a battery cover member constructed in accordance with the present invention.
Figure 2:
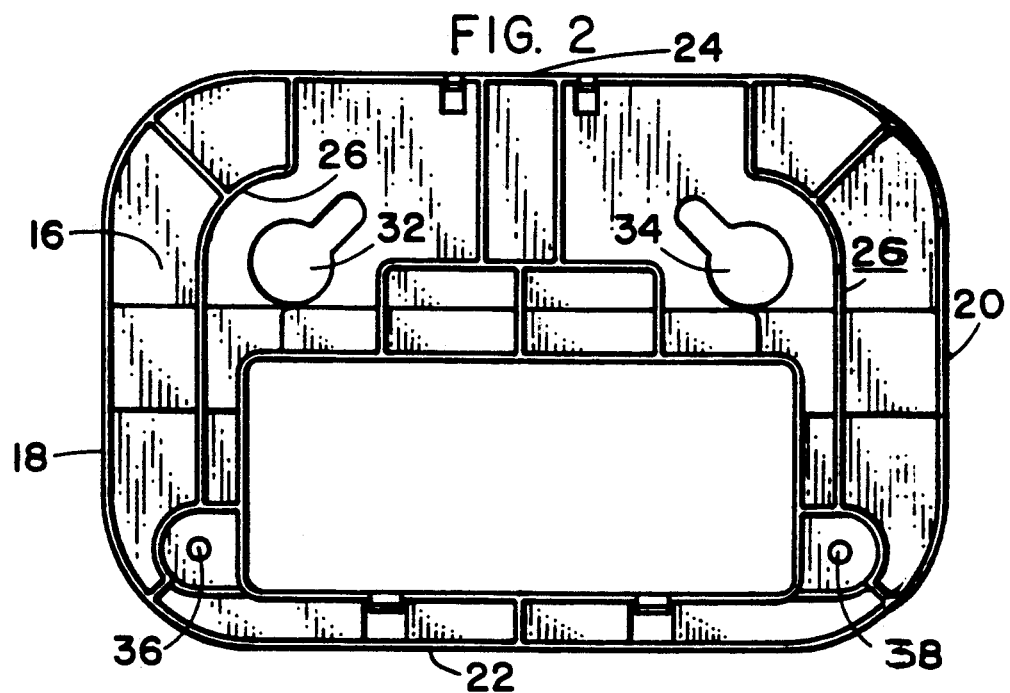
FIG. 2 is a bottom plan view of the cover member of FIG. 1.
Figure 3:
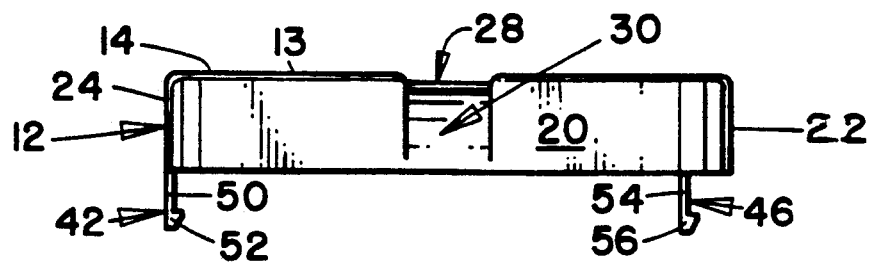
FIG. 3 is a side plan view taken substantially along line 3—3 of FIG. 1.
Figure 4:
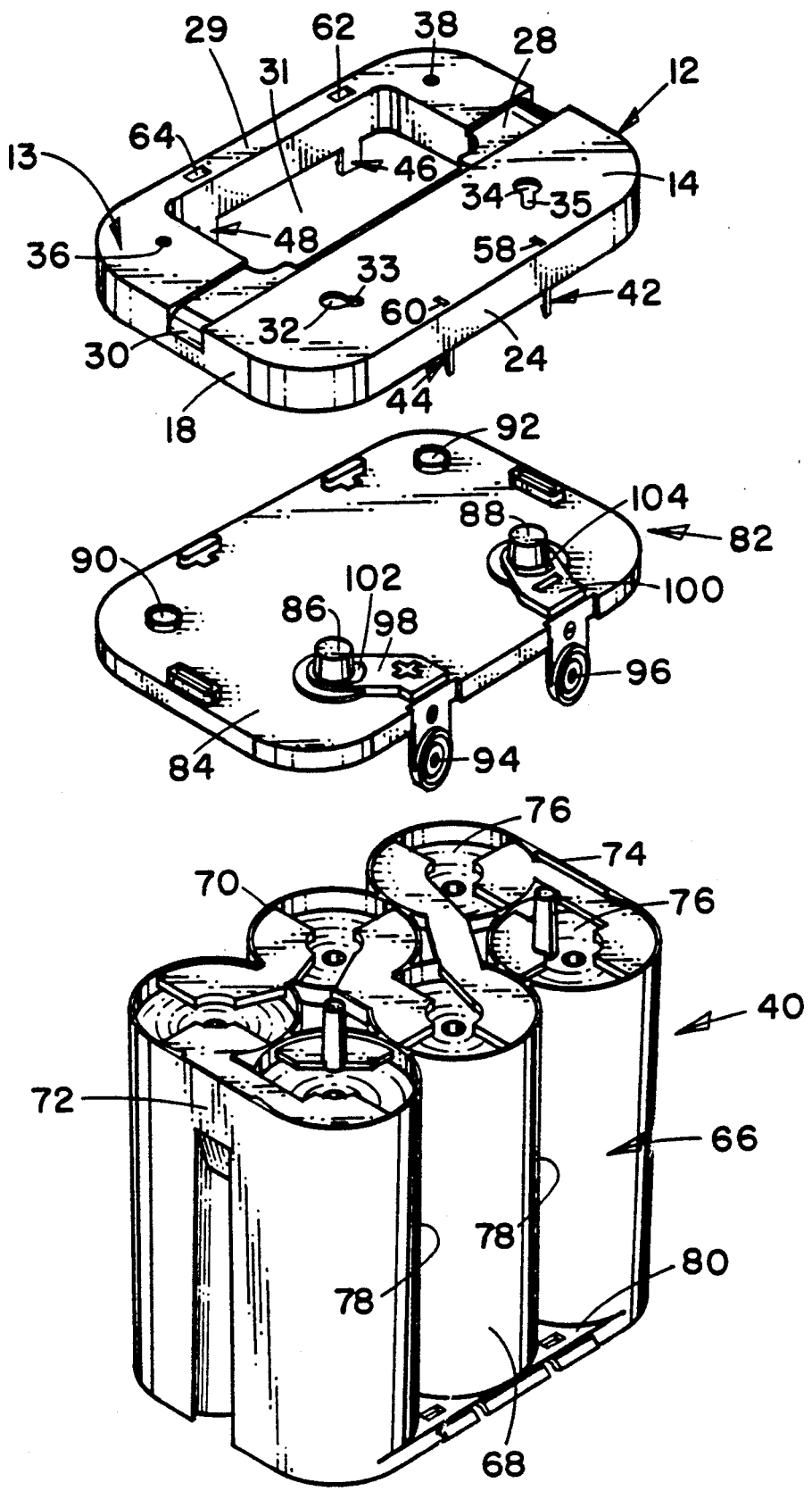
FIG. 4. is a front perspective view, with some parts exploded, of a battery including the cover assembly constructed in accordance with the present invention.

Rechargeable batteries are generally stacked during shipment and are therefore subject to battery terminal damage unless some sort of protector or spacer device is utilized between stacked batteries. Moreover, rechargeable, sealed batteries are being designed having both top terminal connections as well as side terminal connections to meet multiple use requirements. Such design arrangements, however, can lead to an electrical shorting problem during use of the battery when one set of terminals is being used and the other is not, unless the unused terminals are somehow protected. The present invention is a multi-purpose, integral spacer and cover for such a battery, which cover/spacer acts as a spacer member in certain battery mounting applications as well as a protector for the battery top terminals during shipment and in certain battery applications.

Referring now to FIGS. 1-4, a preferred unitary body 10 is preferably in the form of a cover member 12 having a top plate 13 with an upper planer surface 14, a bottom planer surface 16, oppositely disposed end portions 18, 20, and oppositely disposed side portions 22, 24. A plurality of structural support members 26 are preferably in the form of a web of interconnected ribs projecting downwardly from the bottom surface 16 of the plate 13 and are interconnected with each other as well as connected to the end members 18, 20 and the side members 22, 24. The web of structural support members 26 provide support and strength to the cover member 12 when in position on top of or beneath a battery housing as discussed in greater detail below.

The cover member 12 and components thereof may be constructed from any desired material, preferably nonconductive, and more preferably a plastic polyvinyl chloride-type of material. Moreover, the cover member 12 and components thereof are preferably comprised of a unitary, single molded article of manufacture for reduced cost and increased strength, although cover member 12 may alternatively be constructed from various component parts joined together into one structure.

The cover member 12 preferably includes an elongated recessed area 28 disposed along the top surface 14 of the plate 13. The recessed area 28 is preferably positioned along the entire length of the plate 13 substantially along the center line thereof and also defines end recess portions 30 along the end surfaces 18, 20 of the cover 12. This arrangement is more clearly illustrated in FIGS. 4-6. An enlarged opening 31 is also preferably provided in the plate 13 adjacent a section of the recessed portion 28 to define part of the below mentioned nesting area as well as to permit viewing of the battery lid and to form a reinforced side member 29. The recessed portion 28 and opening 31 are provided for the nesting of a handle during stacking of the battery housings as described in greater detail below.

The plate 13 also includes a pair of apertures 32, 34 which are positioned for alignment with the top terminal portions of the battery housing assembly to be described below. Slots or channels 33, 35 are also provided in the plate 13 extending outwardly from the circumferential edge of the apertures 30, 32, respectively. The apertures 32, 34 and channels 33, 35 are sized so as to provide limited access, if desired, to the terminals. For easy identification, lettering indicating positive and negative are provided on the top surface 14 proximate each of the apertures 32, 34. Small apertures 36, 38 are also optionally provided as air vents to the venting devices which may be present in the lid structure of the battery housing.

Figure 6:
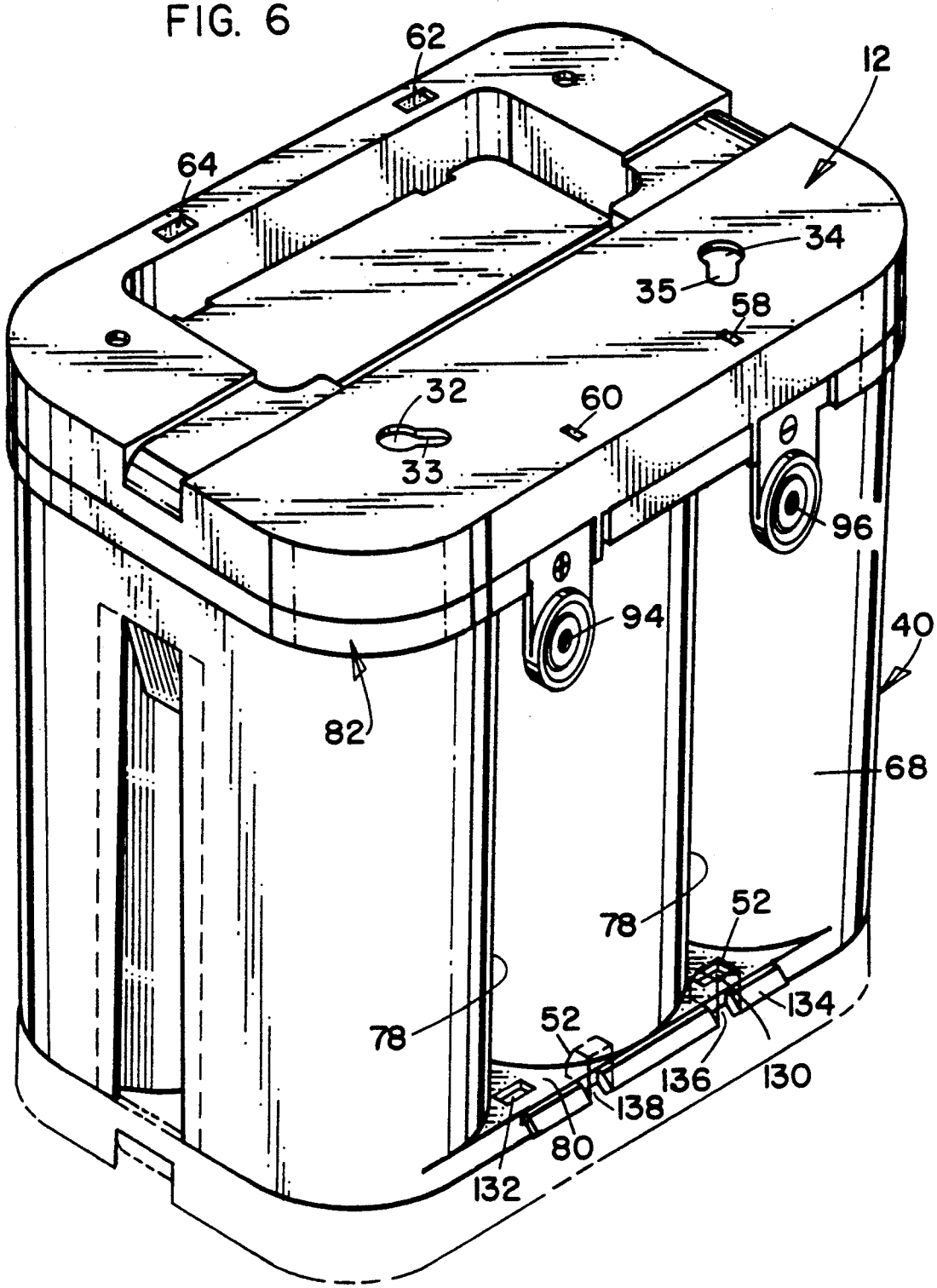
FIG. 6 is a front perspective view of the battery illustrated in FIG. 4 with all components assembled and the cover member positioned over the top surface of the battery.
Figure 7:
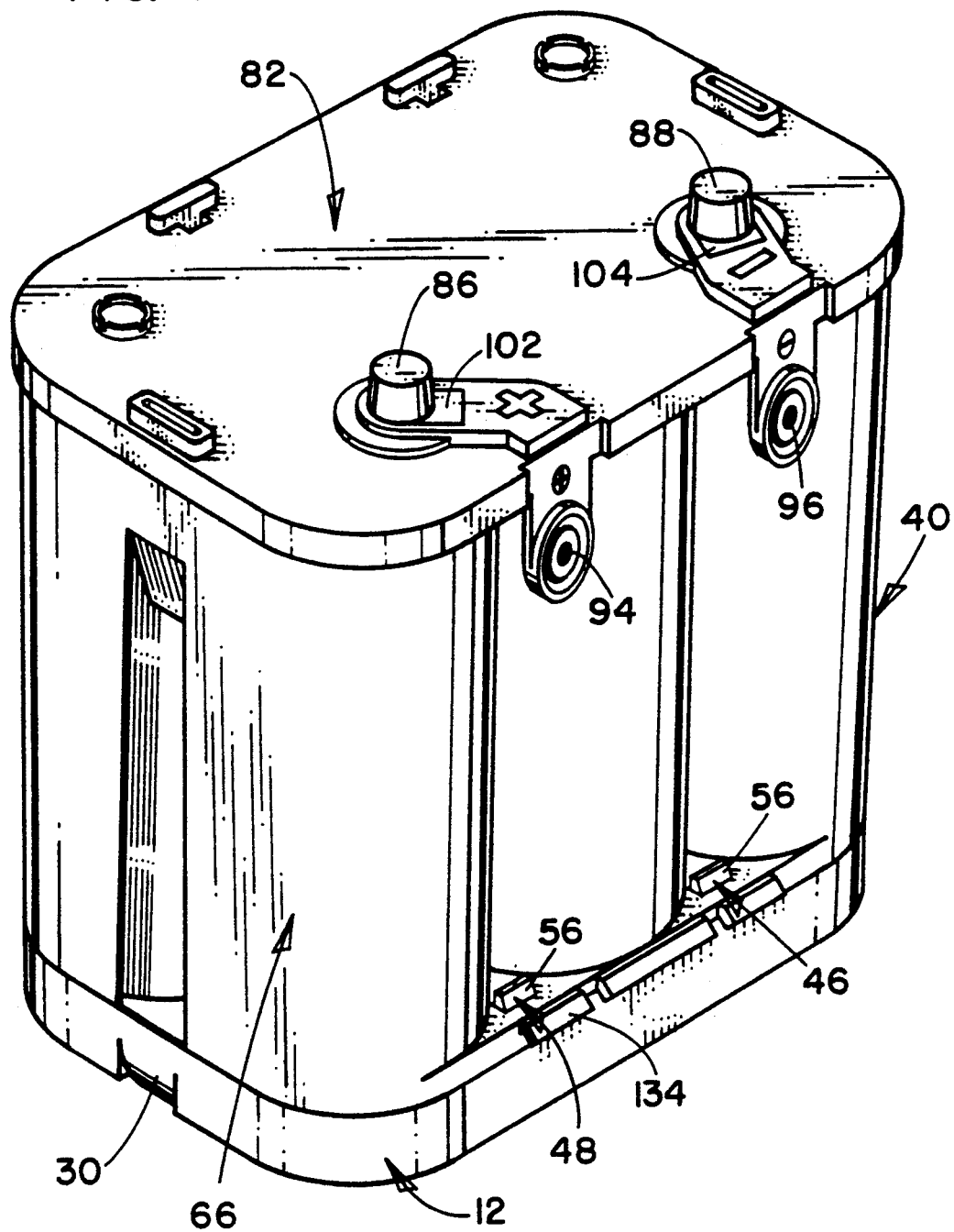
FIG. 7 is a front perspective view of the battery similar to that illustrated in FIG. 6 but illustrating the cover member positioned as a spacer at the bottom surface of the battery.

The attachment of the cover 12 to the top of a battery assembly housing 40 is preferably provided by two sets of releasable attachment mechanisms 42, 44 and 46, 48. The attachment mechanisms 42, 44 and 46, 48 are arranged to secure the cover to the battery housing 40 whether the cover 12 is in its top cover position as shown in FIG. 6 or its bottom spacer position as shown in FIG. 7. While any appropriate and desired releasable attachment mechanism may be utilized, each of the attachment mechanisms 42, 44 and 46, 48 are preferably in the form of a pair of hook or catch members 42, 44 and 46, 48. Each of the hook members 42, 44 includes a resilient arm member 50 extending from the cover 12 and an end clip or catch 52 cantilevered at the end of the arm member 50. Likewise, each of the attachment members 46, 48 includes a resilient arm member 54 extending downwardly from the cover 12 and an end clip or catch 56 cantilevered from the free end of the arm 54. Each of the attachment members 42, 44 are spaced from each other along the side 24 of the cover 12, and each of the attachment members 46, 48 are likewise spaced from each other along the side 22 of the cover 12 so as to provide for a plurality of releasable attachment points between the cover 12 and the housing 40.

The plate 13 of the cover 12 includes a plurality of paired openings 58, 60, 62, 64 in the surface 14 thereof immediately above and in vertical alignment with the attachment members 42, 44 and 46, 48. The openings 58-64 permit access to the catches 52, 56 of the paired attachment members 42, 44 and 46, 48 in order to release them from their latched position as described below.

Referring more particularly, now, to FIGS. 4-8, a typical battery housing 40 is preferably in the form of a mono-block container 66 having sidewall portions 68, 70 and end wall portions 72, 74. In a preferred form, the housing in 66 is sized and shaped to receive a plurality of cylindrical cells 76 which merge together at the sidewall portions 68, 70 and end wall portion 72, 74 along vertically aligned, tangential contact points between respective cells to perform a plurality of nip areas 78 along the exterior side walls 68, 70 and end walls 72, 74 of the battery casing 66. A bottom plate or portion 80 is provided to the casing 66, and a housing lid 82 is also provided for forming the top of the housing 66.

The lid 82 is preferably in the form of a single, molded member 84 having top terminal connection posts 86, 88 projecting upwardly therefrom. In addition, vent members 90, 92 are provided for assisting in venting the housing 66. Side terminal posts 94, 96 are provided and preferably project vertically downwardly from the edge of the singular member 84 so as to nest in the nip areas 78 in the sidewall 68 of the housing 66 when the lid 82 is positioned on the housing 66. The positive side terminal 94 is connected to the positive top terminal post 86 by way of a metal connection member (not illustrated) which is embedded within a protective lid cover portion 98 which is preferably integrally molded into the member 84. Likewise, the negative side terminal connection post 96 is connected to the negative top terminal post 88 by way of a conductive member (not illustrated) which is embedded within a protective lid connection member 100 integrally molded into the member 84. In this manner, shorting of the battery assembly 40 is prevented due to the non-conductive covering of the innerconnection members between the side terminal posts 94, 96 and the top terminal posts 86, 88.

In addition, an exposed or open area in the form of an electrical contact 102 is provided along the base of the positive top terminal post 86, and a similar exposed or open area in the form of an electrical contact 104 is provided along the base of the top negative terminal post 88 in order to permit selective electrical testing of the battery assembly 40 without removal of the cover 12 by access through the aperture extensions 33, 35 of the apertures 32, 34 in the cover 12. In order to achieve such testing, a probe (not illustrated) of standard design may be inserted through the extensions 33, 35 and brought into contact with the electrical contact areas 102, 104, yet access to the terminal posts 86, 88 and the contacts 102, 104 is limited by the cover 12 to prevent inadvertent contact and electrical shorting.

Figure 5:
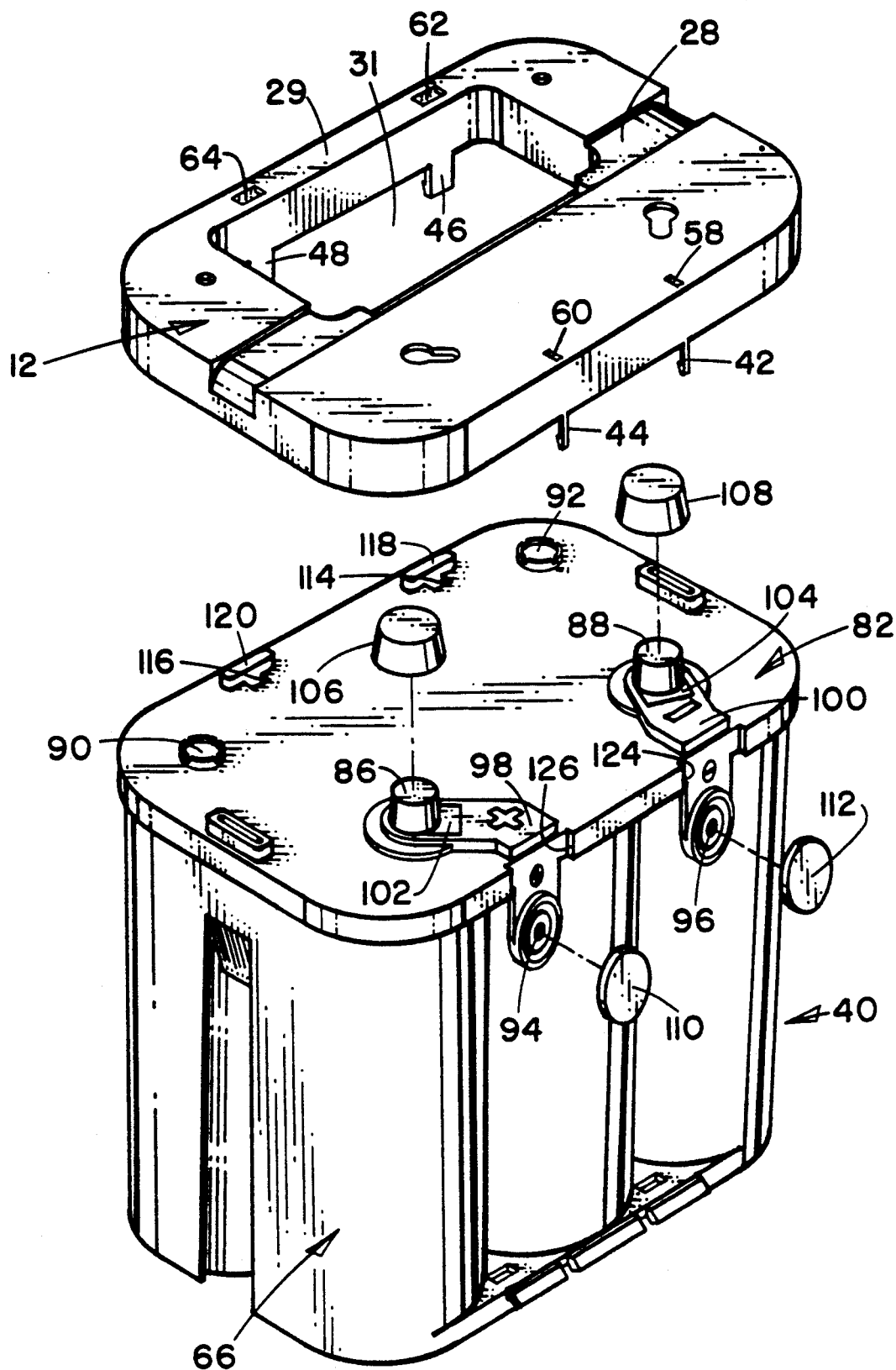
FIG. 5 is a front perspective view, with one part exploded, of the battery illustrated in FIG. 4 having the lid portion attached to the battery housing.

Referring particularly to FIG. 5, the positioning and placement of the lid 82 onto the battery housing assembly 40 is illustrated more clearly. In a preferred form, top terminal post caps 106 and 108 may be placed over the terminal posts 86, 88 prior to attachment of the cover 12 for storage or transportation purposes and whenever the side terminal posts 94, 96 are utilized. The caps 106, 108 are sized and shaped to permit access to the electrical contacts 102, 104 when in position over the posts 86, 88. Likewise, side terminal post caps 110, 112 are removably securable to the side terminal posts 94, 96 in order to prevent inadverting shorting of the battery housing 40 during use of top terminal posts 86, 88 as well as to prevent damage during transportation of the housing 40.

Figure 8:
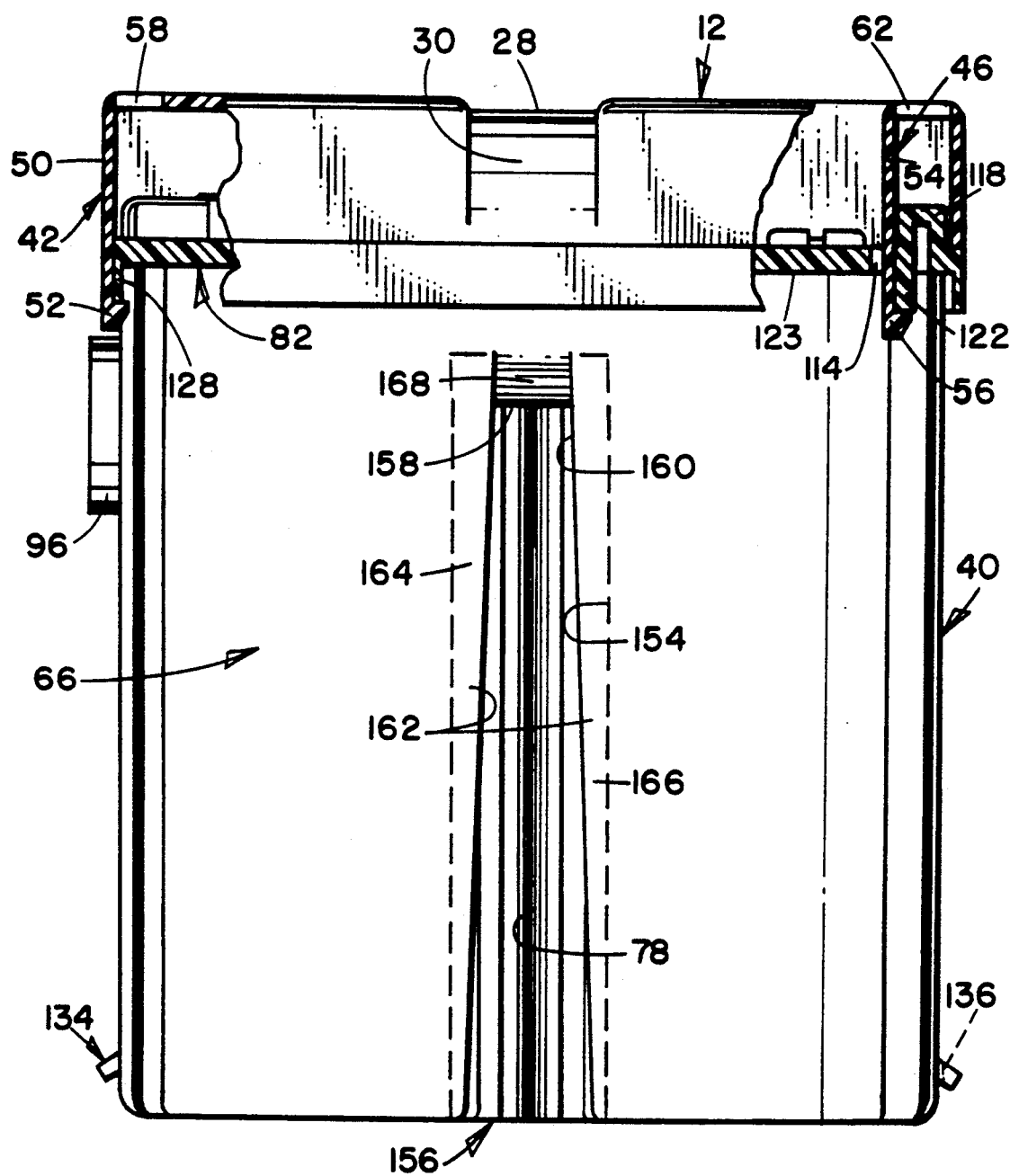
FIG. 8 is a side plan view, with some parts in section, of the battery illustrated in FIG. 6.

Referring to FIGS. 5, 6 and 8, the lid 82 includes a pair of spaced openings 114, 116 which are sized and shaped to receive the attachment members 46, 48 when the cover 12 is placed in its cover position on top of the lid 82. The positioning of the attachment members 46, 48 relative to the apertures 114, 116 can be more clearly seen at FIG. 8. In addition, connector members 118 and 120 are molded into position relative to the apertures 114, 116 to receive the attachment members 46, 48. By way of example, and looking particularly at FIG. 8, the connector member 118 includes a lower extending ledge or lip portion 122 which depends downwardly past the bottom surface 123 of the lid 82 adjacent the opening 114 so as to provide a ledge or a lip to which the catch 56 of the attachment member 46 may engage. As can be further seen from FIG. 8, the purpose of the aperture 62 in the cover 12 is to permit the insertion of a tool or some other object to be able to force the arm 54 of the attachment member 46 away from the ledge 122 to disengage the catch 56 for the removal of the cover 12 from the housing 40. It should be understood that the attachment member 48 functions in like manner with the connector member 120.

The lid 82 further includes a pair of notched shoulders 124, 126 positioned adjacent the depending portions of the members 98, 100 on the edge of the lid 82 opposite from the apertures 114, 116. The notched shoulders 124, 126 are created for alignment with the attachment members 42, 44, with the arm portions 50 of the attachment members 42, 44 abutting the shoulders 124, 126. Each of the shoulders 124, 126 creates a ledge 128 at the bottom portion thereof, as illustrated in FIG. 8. The ledge 128 is adapted to engage the catch 52 of the attachment members 42, 44 so as to engage the attachment members 42, 44 with the lid 82. The apertures 58, 60 are designed to permit a tool or other elongated object for insertion therein to press against the arm member 50 in order to disengage the catch 52 from the ledge 128. In this manner, the cover 12 may be securely fastened to the lid 82 and readily removed therefrom as clearly illustrated in FIGS. 5 and 6.

The cover member 12, when installed on top of the battery assembly 40, provides protection for the upright top terminal posts 86 and 88 during shipping and storage. Batteries may be stacked one on top of each other without damaging the terminals 86, 88 or without applying undue stress to the terminals 86, 88 of the battery beneath it, since the posts 86, 88 even with their caps 106, 108 are recessed relative to the top surface 14 of the cover 12. The aperture extension slots 33, 35 are provided in the areas above the exposed electrical contacts 102, 104 such that the electrical condition of the battery 40 may be tested at any time while the cover 12 and caps 106, 108 are in place. The cover 12 and caps 106, 108 may be left in place on top of the battery assembly 40 to protect the upright terminals 86, 88 in applications that utilize the side terminal posts 94, 96 in order to prevent shorting of the battery by unnecessary exposure of additional, yet unused terminals. Moreover, the positioning and attachment of the cover 12 on top of the battery assembly 40 does not depend on the upright top terminal post 86, 88 as in some prior battery arrangements, but rather depends entirely upon the arrangement of the attachment members 42, 44 and 46, 48 relative to the battery lid 82. In this manner, damage is also prevented to the upright terminals 86, 88. Unlike some existing battery spacers or covers, if a stack of batteries positioned one on top of each other with the cover 12 in place should shift during transit, no stress would be applied to the upright terminal posts 86, 88.

Referring now to FIGS. 6, 7, and 8, the cover member 12 may also be utilized as a mounting spacer. The bottom plate or member 80 of the battery assembly 40 includes a pair of apertures 130, 132 positioned proximate the nip areas 78. The apertures 130, 132 may be on just one side 68 of the battery assembly 40 or they may be positioned on both sides 68, 70 thereof. In addition, a flange 134 is provided along the edge of the bottom portion 80 on either one side 68 or both sides 68, 70, depending upon preference. The flange 134 includes a pair of slots 136, 138 therein, and again such slots may occur on the flange 134 of one or both sides of the battery housing 40. The apertures 130, 132 are spaced and sized so as to receive the catch 56 of the attachment members 46, 48 when the cover 12 is positioned beneath the battery housing 40 in an inverted position as illustrated in FIG. 7. Moreover, the slots 136, 138 are spaced apart so that the catches 52 of the attachment members 42, 44 will engage the flange 134 with the arms 50 of the attachment members 42, 44 passing through the slots 136, 138. The arrangement of the apertures 130, 132 and the slots 136, 138 may be such that only one set of apertures 130, 132 is disposed on one side 68 of the battery 40 while only one pair of the slots 136, 138 are disposed on the opposite side 70 of the battery housing 40 so as to enable or permit the positioning of the cover member 12 in only one arrangement relative to the housing 40. In an alternative embodiment, two pairs of apertures 130, 132 and two pairs of slots 136, 138 may be positioned, one of each pair on each side 68 and 70 of the housing 40, so as to permit the cover 12 to be placed beneath the battery housing 40 in one of two different orientations.

The cover assembly 12 may be removed from its spacer position beneath the housing 40 by simply pressing the catches 52, 56 of both of the attachment members 42, 44 and 46, 48, the catches 52 and 56 being fully exposed for such removal. The cover member 12 in its mounting spacer position beneath the battery 40 is utilized in applications where the battery assembly 40 is shorter in height than the old battery it is replacing. The cover 12 as a spacer is removable and may be discarded from those applications that do not require the additional overall battery height and do not require side terminal connections, so that the cover 12 is required neither as a spacer beneath the battery assembly 40 or as a permanent cover 12 on top of the battery assembly 40, since the top terminal posts in such applications would need to be accessed.

Figure 9:
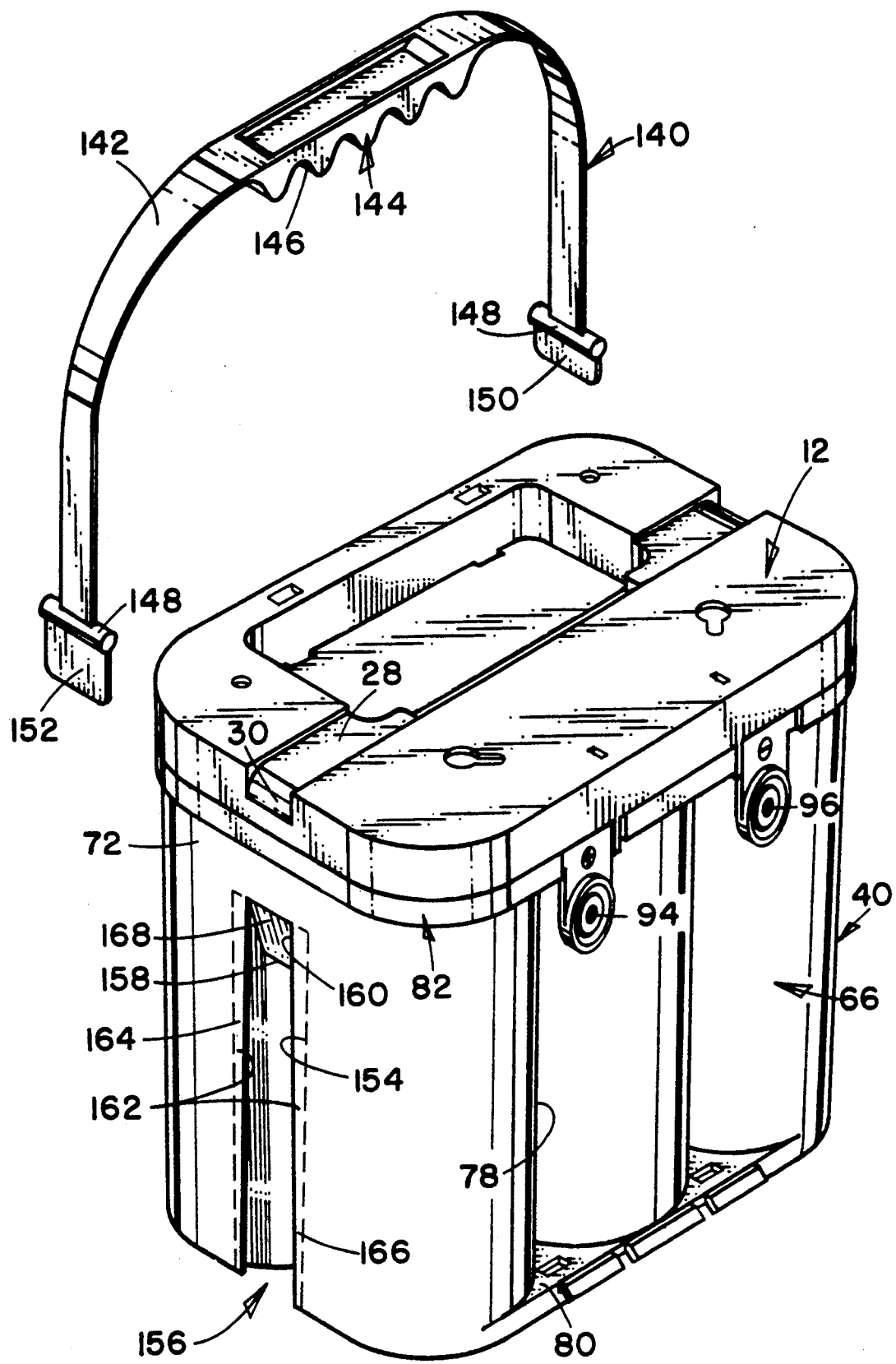
FIG. 9 is a front perspective view of the battery illustrated in FIG. 6 with a handle assembly positioned for attachment thereto.
Figure 10:
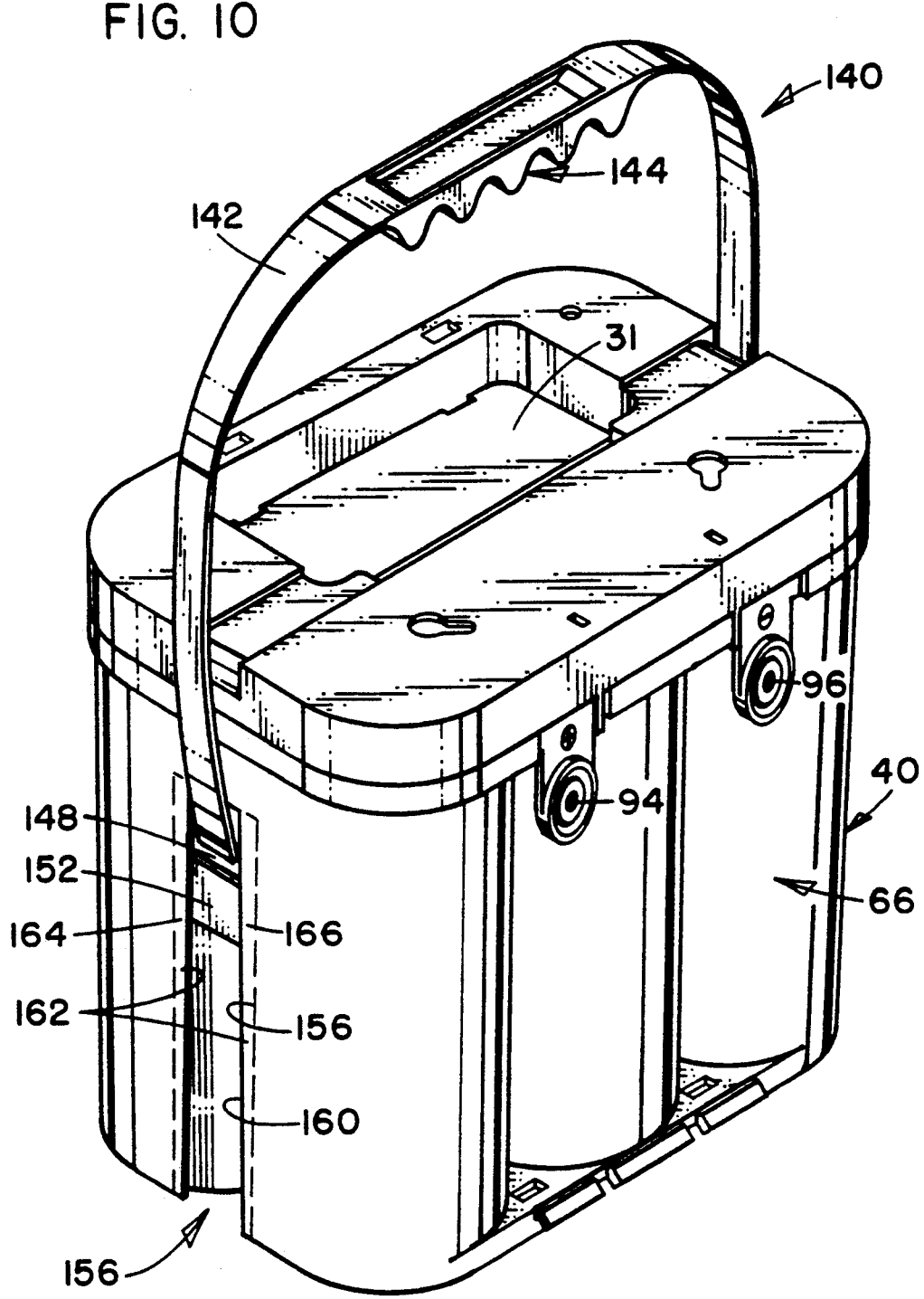
FIG. 10 is a front perspective view similar to that of FIG. 9 but illustrating the handle assembly in a fully assembled position for carrying.
Figure 11:
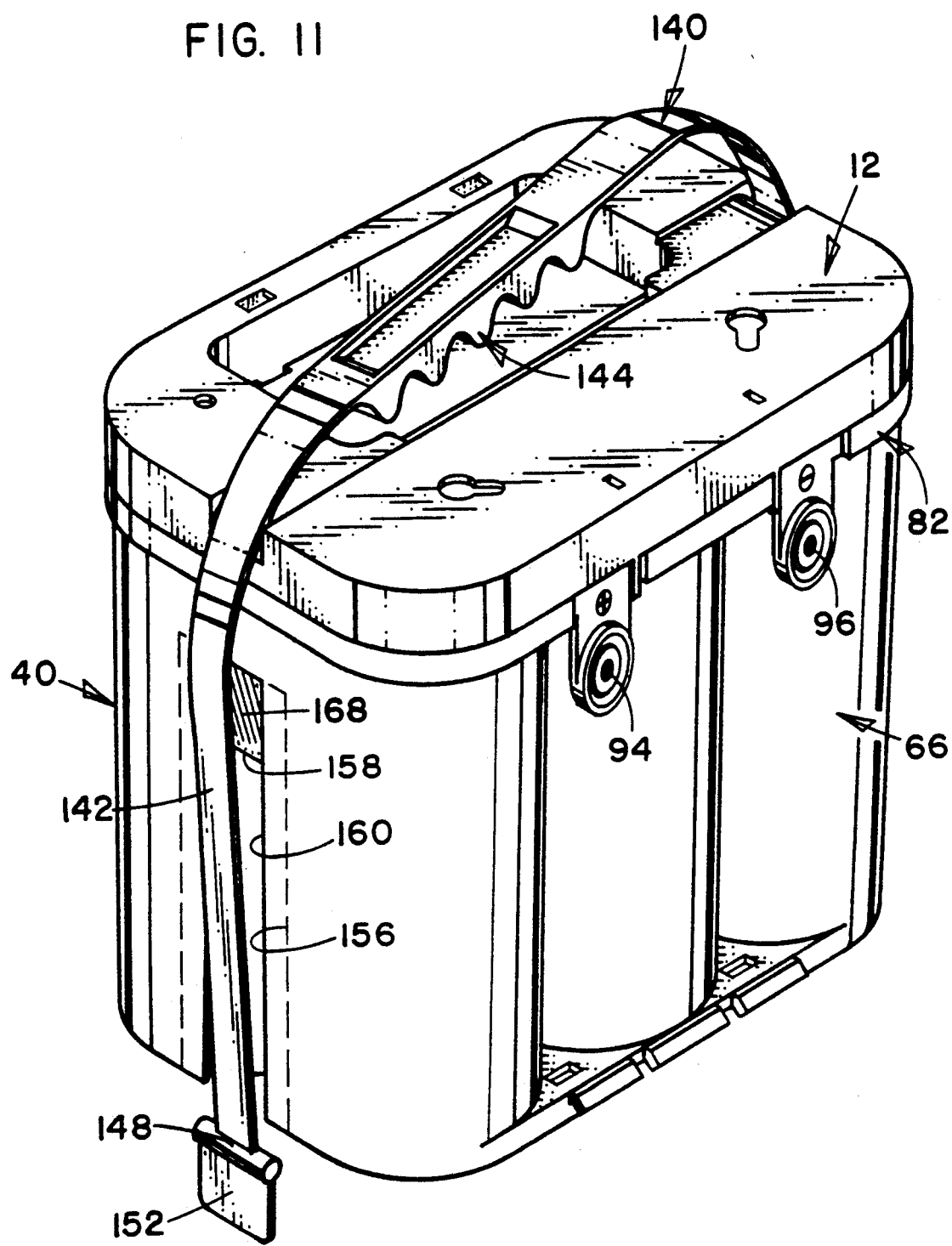
FIG. 11 is a front perspective view of the battery illustrated in FIG. 10 but showing the handle assembly in a partially disengaged position for removal or attachment of the handle assembly to the battery.

Referring now in particular to FIGS. 9-11, a handle or carrying assembly 140 is provided and is preferably in the form of a strap 142 that is shaped in the form of a "U". The strap 142 is preferably constructed from any known material which has some flexibility yet has the resiliency to snap back to its U-shaped form. In preferred form, the strap 142 is manufactured from a PVC type flexible plastic material. In a preferred form, a hand grip 144 having finger notches 146 therein may be provided to assist in carrying the battery assembly 40. The strap 142 terminates at each end thereof in a stop member or bar 148 which is aligned transversely relative to the length of the strap 142. Projecting downwardly from each stop member 148 is a flange 150 at one end of the strap 142 and a somewhat longer, larger flange member 152 at the opposite end of the strap member 142.

Each end portion 72, 74 of the battery housing 66 includes an end channel 154 that extends from the bottom of the housing 66 toward the top portion of the housing 66. The bottom plate 80 of the housing 66 has an opening 156 that permits the channel 154 to be open at the bottom thereof. The channel 154 terminates at its uppermost end against a shoulder 158 which is spaced from the lid 82. The channel 154 overlaps the nip area 78 (see FIG. 8) in the end 72 equidistantly. An elongated opening 160 is provided in the end portions 72, 74 of the housing 66 along the longitudinal axis of the channel 154, the opening 160 being preferably flared outwardly toward the open end 156 yet narrower than the channel 154. In this manner, a grooved slot 162 is defined in the channel 154 as a result of overlapping side members 164, 166. The opening 160 terminates along a point closer to lid 82 as compared to the shoulder 158. The area 168 between the end of the opening 160 and the shoulder 158 is preferably in the form of a slanted or sloped member aligned with the recess 28 and the recessed end portion 30 in cover 12 so as to cooperate with each other relative to the handle 140 as described below.

During normal use of the battery assembly 40, and referring particularly to FIG. 10, the handle assembly 140 is positioned and connected to the housing 66 so that the flanges 150 and 152 are disposed within the grooved slot 162 as in a tongue-in-groove arrangement, with the stop members 148 being abutted against the shoulder 158. Thus, when the battery 40 is carried by the handle grip 144, the stop members 148 abut the shoulders 158 and provide firm attachment for the handle assembly 140 to the battery housing 40. When it is desired to stack batteries 40 one atop the other, the handle grip 144 is pressed downwardly toward the cover 12 so as to slide the flanges 150 and 152 along the channel 154 to the extent wherein the handle grip 144 is then positioned within the opening 31 with the strap 142 being nested in the recessed portion 28 and end portions 30. In this manner, the entire handle assembly 140 may be nested down into the cover 12 and be substantially flush with the surface 14 of the cover member 12 to permit stacking of the battery assemblies 40 one atop the other without damaging the handle assembly 140 or causing the stack of batteries to be unstable.

When it is desired to place the battery assembly 40 in operating position, the handle assembly 140 may be entirely removed and discarded. This is performed by placing the end flange 150 with its stop 148 at the very uppermost portion of the channel 154 in the side portion 74 of the housing 66, and then extending the end flange 152 with its stop 148 downwardly along its channel 154 so as to clear the end stop 148 beyond the opening 156 and remove the flange 152 and end stop 148 from the channel 154 as illustrated in FIG. 11. Once the flange 152 and end stop 148 is removed, the remaining flange 150 with its end stop 148 may likewise be removed from its channel 154 in housing end portion 74 so as to totally disengage the handle assembly 140. In this manner, a handle assembly is provided which does not interfere with the stacking of the batteries and yet is readily available for transportation of the battery. Moreover, the handle assembly may be totally removed in easy fashion for operation of the battery and may be reused or discarded. In this manner, a battery hold down in actual battery applications or with other batteries during shipping and storage can rest firmly on the cover 12 of the battery 40 without damage to or interference by the handle assembly 140.

As can be seen from the above, a combination cover and mounting spacer member for use with multi-cell rechargeable batteries is provided. This particular cover functions to protect the battery terminal posts from damage during shipping and stacking of the battery as well as to protect the battery from electrical shorting when side terminal posts are utilized during certain battery applications. Moreover, the side terminal posts are arranged so as to not interfere with shipping and stacking during storage and transportation. The cover/spacer combination member may also be utilized as a spacer either on top of the battery or beneath the battery for storage or application use. Finally, a handle assembly is provided which may be nested for transportation and storage purposes and may be entirely removed for certain battery applications if desired, yet provides firm gripping and handling of the battery during transportation and carrying thereof. As a result, the combination spacer/cover assembly of the present invention provides multiple uses to both protect rechargeable batteries during transportation and storage as well as to provide protection or spacing appropriate during battery usage in a manner unknown to the prior art. Moreover, this may be done with a single device which is inexpensive to manufacture and is readily adaptable for any type or shape of rechargeable battery.

The foregoing description and the illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of the prior art.

The embodiments for which an exclusive property or privilege is claimed are defined as follows:

1. A device for covering a multi-cell rechargeable battery having top and bottom surfaces and upper terminal connections projecting from said top surface, and for use as a mounting spacer for said battery, said device comprising:

cover means sized and shaped to shield the top surface of said battery when attached thereto including a plate having upper and lower surfaces with apertures disposed therein to provide limited access to said upper terminal connections;

means for spacing said plate from said battery top surface to recess said upper terminal connections relative to the upper surface of said plate for protection against surface contact and electrical shorting, said spacing means being integral with said plate;

means for selectively attaching said cover means to said battery to protect said battery top surface and upper terminal connections from damage from objects placed on said plate, said attaching means being further adapted for selectively securing said cover means to the bottom surface of said battery to function as a spacer for battery mounting; and means for permitting testing of the electrical condition of said battery without removing said cover means.

2. The device as claimed in claim 1, wherein said battery further includes handle means for carrying said battery, and wherein said cover means includes a recess in the upper surface of said plate sized and shaped to receive said handle means substantially flush with said plate upper surface for storage and transportation purposes.

3. The device as claimed in claim 1, wherein said spacing means comprise structural support members depending from the bottom surface of said plate for contact with the top surface of said battery.

4. The device as claimed in claim 3, wherein said spacing means further includes peripheral side members depending from the outer edges of said plate, said structural support members being interconnected to each other and to said peripheral side members to provide structural strength for said cover means.

5. The device as claimed in claim 1, wherein said plate further defines a central opening to permit access to a portion of said battery top surface without access to said upper terminal connections, and wherein said spacing means includes a reinforced side member disposed along one outer edge adjacent to and defining a portion of said central opening.

6. The device as claimed in claim 1, wherein said battery testing means comprises an exposed base area adjacent each said terminal connection and a channel disposed in said plate extending outwardly from the circumference of each said aperture in said plate to permit access to the base area of said terminal connections with a probe insertable through said channel.

7. The device as claimed in claim 1, wherein said attaching means comprises at least two sets of resilient attaching members disposed on opposite edges of said plate, each said set including at least one resilient clip member depending from said plate and adapted for releasable connection with an attachment lip disposed on said battery.

8. The device as claimed in claim 7, wherein each said set of attaching members include a pair of said resilient clip members oriented for spring engagement with respective attachment lips when said cover means is positioned to shield either top or bottom surface of said battery.

9. A combination spacer/cover device for a multi-cell rechargeable battery having top and bottom surfaces and both upper and side terminal connection posts, the combination device comprising:

a cover shell sized and shaped to substantially encase the battery top surface and upper terminal connection posts when secured to said battery to protect said upper terminal connection posts from damage as well as to prevent ready access to said upper connection posts when said side terminal connection posts are exposed, said shell having an upper platform with top and bottom surfaces and a pair of apertures disposed therein for alignment substantially with said upper terminal connection posts;

means for spacing said upper platform from said battery top surface to recess said upper terminal connection posts relative to said platform in alignment with the apertures in said platform;

resilient attachment means for removably securing said shell to the top surface of said battery in its covered position as well as for removably securing said shell to the bottom surface of said battery in a spacer position to provide elevated spacing of said battery for mounting purposes; and access means for permitting the electrical testing of said battery without removal of said shell from its cover position thereon.

10. The combination device as claimed in claim 9, wherein said attachment means are arranged such that said shell in its spacer position is oriented inversely relative to the orientation of said shell in its cover position.

11. The combination device as claimed in claim 9, wherein said attachment means comprise resilient members disposed opposite each other along the side portions of said shell.

12. The combination device as claimed in claim 11, wherein each said resilient member comprises a pair of resilient arms depending from said shell, each said arm having a catch disposed on the cantilevered end thereof for engagement with a ledge member on said battery.

13. The combination device as claimed in claim 9, wherein each said electrical testing access means comprises a channel disposed in said platform and interconnected with one said aperture.

14. The combination device as claimed in claim 9, wherein said spacing means comprises an interconnected web of support members projecting downwardly from the bottom surface of said platform an effective amount to recess said top terminal posts relative to the upper surface of said platform.

15. The combination device as claimed in claim 9, wherein said battery further includes handle means for carrying said battery, and wherein said shell includes a recess in the upper surface of said platform sized and shaped to receive said handle means substantially flush with the upper surface of said platform for storage and transportation purposes.

16. A cover assembly for a multi-cell rechargeable battery including a battery casing having end and sidewall portions and a bottom plate secured to said end and sidewall portions, said cover assembly comprising:

a casing lid interconnecting said end and sidewall portions opposite said bottom plate to form a top for said battery casing;

a pair of positive and negative top terminal connection posts projecting upwardly from the top surface of said lid;

a pair of positive and negative side terminal connection members projecting from said lid downwardly along one side wall portion of said casing;

means for electrically interconnecting said positive top connection post with said positive side connection member and for electrically interconnecting said negative top connection post with said negative side connection member;

a cover member member sized and shaped to fit over said casing lid to protect said top terminal connection posts as well as to prevent ready access to said top terminal connection posts when said side terminal connection members are exposed, said cover member having an upper surface with apertures disposed therein aligned substantially with said top terminal connection posts;

means for spacing the upper surface of said cover member from said lid to recess said top terminal connection posts relative to said cover member upper surface for protection against surface contact and electrical shorting; and means for selectively attaching the cover member to said lid in its cover position as well as for selectively securing said cover member to said bottom plate to function as a spacer member for battery mounting.

17. The cover assembly as claimed in claim 16, wherein each said electrical interconnection means is at least partially embedded in said lid to inhibit electrical shorting of said battery.

18. The cover assembly as claimed in claim 17, wherein each said interconnection means comprises a conductive member interconnecting its respective upper terminal post and side terminal member.

19. The cover assembly as claimed in claim 18, wherein each said conductor member includes an exposed portion adjacent the base area of its respective top terminal connection post to provide a contact area accessible for the testing of the electrical condition of said battery with said cover member in its cover position over said lid.

20. The cover assembly as claimed in claim 16, wherein said assembly further includes insulative cap members covering said top terminal connection posts and said side terminal connection members when not in use.

21. The cover assembly as claimed in claim 16, wherein said cover member upper surface further includes access means in the form of a channel extending from each said aperture for permitting the electrical testing of said battery without removal of said cover member from its cover position on said lid.

22. The cover assembly of claim 16, wherein said attachment means are arranged to orient said cover member in an inverse position relative to its cover position when secured to said bottom plate as a spacer member.

23. The cover assembly as claimed in claim 22, wherein said attachment means comprise resilient members disposed on both sides of said cover member, each said resilient member including as least one resilient armature projecting downwardly from the edge of said cover member and having a catch disposed at the cantilevered end thereof.

24. The cover assembly as claimed in claim 23, wherein said attachment means further includes a plurality of ledge members disposed in said bottom plate aligned to receive the end catch of each said attachment armature to maintain said cover member in its inverted spacer orientation.

25. The cover assembly as claimed in claim 23, wherein said attachment means further includes a plurality of ledge members disposed in said lid adapted and oriented to receive the end catch portions of said armatures from said cover member when positioned over said lid in said cover position.

26. The cover assembly as claimed in claim 16, wherein said battery casing further includes handle means for carrying said battery, and wherein said cover member includes a recess disposed in the upper surface thereof sized and shaped to receive said handle means substantially flush with said upper surface for battery storage and transportation purposes.

27. The cover assembly as claimed in claim 16, wherein said battery casing comprises a monobloc jar container with cylindrical cell components merging together at tangential contact points between respective cells to form a plurality of nip areas along the exterior of said battery casing end and sidewall portions, and wherein said side terminal connection members project downwardly from said lid along one side wall portion recessed into said nip areas along said sidewall portion to minimize the projection of said side terminal connection members outwardly from said sidewall portion of said battery casing.

28. In a battery housing for a multi-cell rechargeable battery having a battery casing in the form of a monobloc jar container with a plurality of integrally molded cylindrical cell compartments which merge together at tangential contact points therebetween to form the exterior sidewalls and end portions of said casing, and a bottom portion integrally molded with said cell compartments to form the bottom surfaces of said compartments as well as the bottom portion of said casing, the improvement comprising:

a casing lid to form a top for said monobloc container and including a pair of positive and negative top terminal connection posts projecting upwardly from the top surface of said lid and a pair of positive and negative side terminal connection members depending from one side edge of said lid downwardly along one sidewall portion of said casing recessed into said tangential contact points between said cell compartments;

means for electrically interconnecting said positive top and side connection members and for electrically interconnecting said negative top and side connection members;

a cover sized and shaped to fit over said lid to protect said top terminal connection posts and prevent ready access to said posts when said side terminal connection members are exposed for operational use, said cover having an upper surface with apertures disposed therein aligned substantially with said top terminal connection posts;

means for spacing the upper surface of said cover from said lid to recess the top terminal connection posts relative to the upper surface of the cover for protection against surface contact and electrical shorting;

means for removably attaching said cover to said lid in a cover position over said lid as well as for removably securing said cover member to said battery casing bottom portion to selectively function as a spacer when mounting said battery; and means for carrying said battery in an upright position, said cover including a recess in the upper surface thereof sized and shaped to receive said carrying means substantially flush with the upper surface of said cover for storage and transportation purposes, said carrying means being adapted for selective movement between a storage position recessed in said cover and a carrying position positioned substantially above said cover.

29. The battery housing of claim 28, wherein each said electrically interconnecting means comprises a conductive member extending from each upper terminal connection post to its respective side terminal connection member, at least a portion of said conductive member being embedded in said lid, said positive and negative side terminal connection members being positioned in adjacent tangential contact cell compartments.

30. The battery housing of claim 29, wherein said carrying means comprises a looped strap member connected at each end to oppositely disposed casing end portions and extending and looping over said lid, said strap member having end connection members vertically movable along their respective end portions to permit movement of said carrying means between its storage position in the recessed area within said cover and a carrying position disposed above said cover.

31. The battery housing of claim 30, wherein each said end connection area for said strap on each end portion thereof comprises an elongated vertical channel disposed along said end portion and including a slot along the length thereof through which said strap passes, and wherein each strap end area comprises an elongated portion sized and shaped to vertically move within said channel without being removable through said slot.

32. The battery housing of claim 31, wherein each said channel is open at its bottom end, and wherein said strap is of sufficient length such that one end portion thereof is disengagable from the open end of one channel while the opposite end of said strap is positioned at the upper end of its channel adjacent said cover.

33. A cap device for use with a multi-cell rechargeable battery, which battery has a top surface, a bottom surface, upper positive and negative terminal connections which project from the top surface, comprising:

a removable cap, including a cover plate having a top surface and a bottom surface, said plate being sized and shaped to provide a substantially flat load bearing top surface which, when said cap is attached to the top of the battery, shields the top surface of the battery, including at least the upper positive and negative terminal connections of the battery, and which top surface also provides a flat surface for use in stacking batteries during shipping and storage;

means, integral with said bottom surface of said plate, for spacing the bottom surface of said cover plate from the top surface of the battery, and for enclosing the upper terminal connections in recess relative to the upper surface of said plate for protection of the upper terminal connections against surface contact within the cap and also for protection of the upper terminal connections from exterior objects which may cause electrical shorting; and means carried by said cap device for removably attaching said cap device to the top of a battery; whereby, when said cap device is attached to the top of the battery, it provides a substantially flat load bearing top surface which shields the top surface of the battery, including the upper positive and negative terminal connections of the battery and provides a flat surface for use in stacking batteries during shipping and storage.

34. The cap device of claim 33, wherein said cap device is designed to also serve as a mounting spacer below the battery, and said means carried by said cap device for removably attaching said cap to the top of the battery also serve to removably attach said cap to the bottom of the battery.

35. The cap device of claim 33, wherein said cap device defines a pair of apertures disposed through said plate, which apertures are designed and positioned, when said cap device is attached to the top of a battery, to provide limited access to the upper terminal connections for use in testing the electrical condition of the battery without removing said cap device.

* * * * *